(12) United States Patent
Zhao et al.

(10) Patent No.: US 12,119,697 B2
(45) Date of Patent: Oct. 15, 2024

(54) VOLTAGE REGULATION CIRCUIT AND SYSTEM FOR TRACTION BATTERY AND CONTROL METHOD THEREOF

(71) Applicant: CONTEMPORARY AMPEREX TECHNOLOGY CO., LIMITED, Ningde (CN)

(72) Inventors: Yuanmiao Zhao, Ningde (CN); Zhimin Dan, Ningde (CN); Yu Yan, Ningde (CN); Zhanliang Li, Ningde (CN); Xiaojian Huang, Ningde (CN); Xinwei Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/594,808

(22) Filed: Mar. 4, 2024

(65) Prior Publication Data

US 2024/0250548 A1 Jul. 25, 2024

Related U.S. Application Data

(63) Continuation of application No. PCT/CN2022/119653, filed on Sep. 19, 2022.

(30) Foreign Application Priority Data

May 12, 2022 (CN) .......................... 202210511798.0

(51) Int. Cl.
*H02J 7/00* (2006.01)
*B60L 58/18* (2019.01)
*H02J 7/14* (2006.01)

(52) U.S. Cl.
CPC .......... *H02J 7/00712* (2020.01); *B60L 58/18* (2019.02); *H02J 7/0014* (2013.01); *B60L 2240/547* (2013.01)

(58) Field of Classification Search
CPC ...... H02J 7/0012; H02P 27/00; H02P 27/024; H02P 27/04; H02P 27/05
(Continued)

(56) References Cited

U.S. PATENT DOCUMENTS 5,708,352 A * 1/1998 Umeda .................. H02P 9/305
257/E29.104
8,143,861 B2 * 3/2012 Oyobe .................... B60L 53/24
323/251
(Continued)

FOREIGN PATENT DOCUMENTS

| CN | 111347853 A | 6/2020 |
|---|---|---|
| CN | 111347900 A | 6/2020 |

(Continued)

OTHER PUBLICATIONS

International Search Report for PCT application No. PCT/CN2022/119653, dated Jan. 16, 2024.
(Continued)

*Primary Examiner* — Alexis B Pacheco
(74) *Attorney, Agent, or Firm* — Ladas & Parry LLP

(57) ABSTRACT

A voltage regulation circuit for traction battery includes a traction battery, a heating module, a charge/discharge interface, and a voltage regulation module. The heating module includes a power storage element and a switch module. The traction battery is connected in parallel to the switch module. An external charging and discharging device is connected in parallel to the traction battery through the charge/discharge interface. The voltage regulation module includes a plurality of switches and a power storage regulation element, and the plurality of switches and the power storage regulation element are disposed between the charge/discharge interface and the traction battery. The voltage regulation module and the switch module are configured to regulate, in response to a voltage regulation control signal, a charge/discharge volt-
(Continued)

age between the traction battery and the power storage element and a charge voltage of the external charging and discharging device for the traction battery.

18 Claims, 9 Drawing Sheets

(58) Field of Classification Search
USPC .................................................. 320/104, 109
See application file for complete search history.

(56) References Cited

U.S. PATENT DOCUMENTS

| | | | | |
|---|---|---|---|---|
| 8,508,066 | B2* | 8/2013 | Lee ..................... | B60L 50/51 307/9.1 |
| 2002/0172062 | A1* | 11/2002 | Furukawa ............ | B60L 15/025 363/132 |
| 2009/0128158 | A1* | 5/2009 | Kawai ................... | H02M 3/07 324/433 |
| 2014/0001854 | A1* | 1/2014 | Motegi ................. | B60L 55/00 307/38 |
| 2018/0105060 | A1* | 4/2018 | McQuillen ............ | B60L 58/21 |
| 2019/0109462 | A1* | 4/2019 | Götz ..................... | H01M 10/44 |
| 2021/0367431 | A1* | 11/2021 | Yoshida ............. | G01R 31/3278 |
| 2022/0209565 | A1* | 6/2022 | Cheng .................... | B60L 55/00 |
| 2023/0037865 | A1* | 2/2023 | Huang ................ | H01M 10/425 |
| 2023/0378791 | A1* | 11/2023 | Zhao ..................... | B60L 58/12 |
| 2023/0387494 | A1* | 11/2023 | Zhao ..................... | H01M 10/60 |
| 2024/0109457 | A1* | 4/2024 | Chauvin ............... | H01M 10/63 |

FOREIGN PATENT DOCUMENTS

| | | |
|---|---|---|
| CN | 111347926 A | 6/2020 |
| CN | 111660875 A | 9/2020 |
| CN | 114640162 A | 6/2022 |
| EP | 0063756 A1 | 11/1982 |

OTHER PUBLICATIONS

Written Opinion of International Searching Authority for PCT application No. PCT/CN2022/119653, dated Jan. 16, 2024.
First Office Action of CN application No. 202210511798.0, dated Jun. 27, 2022.
Notification to Grant Patent Right for CN application No. 202210511798.0, dated Jul. 15, 2022.

* cited by examiner

VOLTAGE REGULATION CIRCUIT AND SYSTEM FOR TRACTION BATTERY AND CONTROL METHOD THEREOF

CROSS REFERENCE TO RELATED APPLICATIONS

This application is a continuation of International Patent Application No. PCT/CN2022/119653, filed on Sep. 19, 2022, which claims priority to Chinese Patent Application No. 202210511798.0, filed on May 12, 2022. The aforementioned patent applications are incorporated herein by reference in their entirety.

TECHNICAL FIELD

This application relates to the field of battery technologies, and in particular, to a voltage regulation circuit and system for traction battery and a control method thereof.

BACKGROUND

With advantages such as high energy density, cyclic charging, safety, and environmental friendliness, traction batteries have been widely used in new energy vehicles, consumer electronics, energy storage systems, and other fields. With the development of battery technologies, various design parameters of traction batteries are constantly improving. In particular, increasing voltage of the traction batteries is becoming a trend.

Currently, to improve adaptability of electric vehicles in cold regions, most of them employ traction battery self-heating technology. To improve universal adaptability of traction batteries, how charge/discharge voltages of traction batteries are flexibly adjusted in different scenarios is an urgent problem to be solved.

SUMMARY

Embodiments of this application provide a voltage regulation system for traction battery and a control method thereof, so as to flexibly adjust charge/discharge voltage loops of a traction battery to meet charge or discharge voltage requirements on the traction battery in different scenarios.

According to a first aspect, this application provides a voltage regulation circuit for traction battery including a traction battery, a heating module, a charge/discharge interface, and a voltage regulation module, where the heating module includes a power storage element and a switch module; the traction battery is connected in parallel to the switch module; an external charging and discharging device is connected in parallel to the traction battery through the charge/discharge interface; the voltage regulation module includes a plurality of switches and a power storage regulation element, and the plurality of switches and the power storage regulation element are disposed between the charge/discharge interface and the traction battery; and the voltage regulation module and the switch module are configured to regulate, in response to a voltage regulation control signal, a charge/discharge voltage between the traction battery and the power storage element and a charge voltage of the external charging and discharging device for the traction battery.

In the voltage regulation circuit for traction battery provided in the embodiments of this application, the voltage regulation module and the switch module are controlled to switch between different charging and discharging loops, so as to flexibly and efficiently regulate, in response to the voltage regulation control signals under different charging and discharging requirements, the charge/discharge voltage between the traction battery and the power storage element and the charge voltage of the external charging and discharging device for the traction battery, thereby meeting the charge or discharge voltage requirements on the traction battery in different scenarios.

In some embodiments, the voltage regulation module includes a first switch, a second switch, a third switch, a fourth switch, and the power storage regulation element; the first switch is disposed between the power storage element and the switch module; the second switch is disposed between the power storage element and the charge/discharge interface; the third switch and the fourth switch are respectively disposed on a negative electrode side and a positive electrode side of the charge/discharge interface; and the power storage regulation element is disposed between the power storage element and the switch module and also between the power storage element and the charge/discharge interface.

In the voltage regulation circuit for traction battery provided in the embodiments of this application, the switches are disposed at different positions in the charging and discharging loops of the traction battery, so as to achieve a purpose of switching between different charging and discharging loops. Different switches in the voltage regulation module and the switch module can be controlled to be on or off, so as to form, in one circuit structure, driving power supply and battery self-heating modes between the traction battery and the power storage element and boost charging and direct charging modes between the traction battery and the external charging and discharging device, thereby meeting the charge or discharge voltage requirements on the traction battery in different scenarios.

In some embodiments, one terminal of the first switch is connected to the switch module, the other terminal of the first switch is connected to a first terminal of the power storage regulation element, and a second terminal of the power storage regulation element is connected to the power storage element; the first terminal of the power storage regulation element is also connected to one terminal of the second switch and the negative electrode side of the charge/discharge interface, and the other terminal of the second switch is connected to the positive electrode side of the charge/discharge interface; the third switch is disposed between the negative electrode side of the charge/discharge interface and a negative electrode side of the traction battery; and the fourth switch is disposed between the positive electrode side of the charge/discharge interface and a positive electrode side of the traction battery.

In the voltage regulation circuit for traction battery provided in the embodiments of this application, the switches are disposed at different positions in the charging and discharging loops of the traction battery, so as to achieve a purpose of switching between different charging and discharging loops. Different switches in the voltage regulation module and the switch module can be controlled to be on or off, so as to form, in one circuit structure, the driving power supply and battery self-heating modes between the traction battery and the power storage element and the boost charging and direct charging modes between the traction battery and the external charging and discharging device, thereby meeting the charge or discharge voltage requirements on the traction battery in different scenarios.

In some embodiments, the switch module includes a charge-discharge switching module and a leg set, where the charge-discharge switching module is connected in parallel to the leg set, a first terminal of the power storage element is connected to the leg set, a second terminal of the power storage element is connected to the second terminal of the power storage regulation element, the first terminal of the power storage regulation element is connected to one terminal of the first switch, and the other terminal of the first switch is connected to the charge-discharge switching module.

The voltage regulation circuit for traction battery provided in the embodiments of this application stores and supplies energy through the charge-discharge switching module and the leg set during charging and discharging under different charging and discharging requirements, ensuring the driving power supply and battery self-heating between the traction battery and the power storage element and the boost charging and direct charging between the traction battery and the external charging and discharging device.

In some embodiments, a first capacitor is provided between the first terminal of the power storage regulation element and the negative electrode side of the charge/discharge interface.

The voltage regulation circuit for traction battery provided in the embodiments of this application stabilizes the voltage between the first terminal of the power storage regulation element and the negative electrode side of the charge/discharge interface through the first capacitor in the boost charging mode.

In addition, a positive electrode of the first capacitor is connected to the middle between the second switch and the power storage regulation element. When the fourth switch is closed and the second switch is not closed, the current is input from the charge/discharge interface for charging, and the first capacitor does not work, thereby avoiding affecting direct charging for the traction battery by the external charging and discharging device.

In some embodiments, the power storage regulation element is an inductive element.

In the voltage regulation circuit for traction battery provided in the embodiments of this application, the inductive element is disposed on the first terminal of the power storage regulation element, that is, on a neutral connection line of the motor, and inductance of the inductive element can be designed according to actual inductance of a motor winding of a specific motor model.

When a value of the inductive element is 0 or no inductor needs to be disposed, the motor needs no additional increase in weight and volume of the inductive element, and thus has advantages of light-weighting and low costs. When a value of the inductive element is not 0 or no inductor is disposed, because energy is transferred between the battery and the inductor of the motor during the battery self-heating, setting a specific inductance value for the inductive element in this case increases energy stored in the inductor of the motor, thereby optimizing current and frequency parameters during the battery self-heating and improving the effect of the battery self-heating.

In some embodiments, the switch module includes a charge-discharge switching module and a leg set, where the charge-discharge switching module is connected in parallel to the leg set, a first terminal of the power storage element is connected to the leg set, and a second terminal of the power storage element is connected to the charge-discharge switching module.

The voltage regulation circuit for traction battery provided in the embodiments of this application stores and supplies energy through the charge-discharge switching module and the leg set during charging and discharging, ensuring the driving power supply and battery self-heating between the traction battery and the power storage element and the boost charging and direct charging between the traction battery and the external charging and discharging device.

In some embodiments, the power storage element includes an M-phase motor; the leg set includes M phase legs, M being a positive integer; where M phase windings of the M-phase motor are connected to joints between upper legs and lower legs of all of the M phase legs in one-to-one correspondence; and the charge-discharge switching module includes a first switching circuit and a second switching circuit connected in series, and a joint between the first switching circuit and the second switching circuit is connected to a neutral point of the M-phase motor.

The voltage regulation circuit for traction battery provided in the embodiments of this application stores and supplies energy through the charge-discharge switching module and the leg set during charging and discharging, ensuring the driving power supply and battery self-heating between the traction battery and the power storage element and the boost charging and direct charging between the traction battery and the external charging and discharging device. The charge-discharge switching module further ensures free switching between charging and discharging between the battery and the motor and between the battery and the external device.

In some embodiments, both the first switching circuit and the second switching circuit include a triode and a flyback diode connected in parallel.

The voltage regulation circuit for traction battery provided in the embodiments of this application improves efficiency of free switching by the charge-discharge switching module between charging and discharging between the battery and the motor and between the battery and the external device through the triode and the flyback diode connected in parallel.

In some embodiments, both the first switching circuit and the second switching circuit include a triode or a relay switch.

The voltage regulation circuit for traction battery provided in the embodiments of this application improves the efficiency of free switching by the charge-discharge switching module between charging and discharging between the battery and the motor and between the battery and the external device through the triode or the relay switch.

In some embodiments, the first switching circuit includes a diode and the second switching circuit includes a switch; or the first switching circuit includes a switch and the second switching circuit includes a diode.

The voltage regulation circuit for traction battery provided in the embodiments of this application improves the efficiency of free switching by the charge-discharge switching module between charging and discharging between the battery and the motor and between the battery and the external device through a free combination and parallel connection of the diode and the switch.

In some embodiments, a switch and an inductor are provided between the joint between the first switching circuit and the second switching circuit and the neutral point of the M-phase motor.

The voltage regulation circuit for traction battery provided in the embodiments of this application implements flexible switching between the first switching circuit and the second switching circuit in the charge-discharge switching module and the neutral point of the motor through the first switch, ensuring free switching between the battery self-heating and the driving power supply.

In some embodiments, a second capacitor is connected in parallel to the traction battery.

The voltage regulation circuit for traction battery provided in the embodiments of this application stabilizes the voltage across the traction battery through the second capacitor, ensuring the stable and continuous voltage between two terminals of the traction battery or the charge/discharge interface during charging and discharging.

In some embodiments, a fifth switch is provided on the positive electrode side of the traction battery, and a sixth switch is provided on the negative electrode side of the traction battery.

The voltage regulation circuit for traction battery provided in the embodiments of this application flexibly implements switching between different circuit loops under different requirements through the switches on the positive and negative electrode sides of the traction battery.

In some embodiments, the fifth switch is connected in parallel to a branch, and the branch includes a resistor and a seventh switch connected in series.

In the voltage regulation circuit for traction battery provided in the embodiments of this application, the branch in which the resistor and the seventh switch are connected in series flexibly coordinates with the fifth switch, thereby accurately regulating the charge/discharge voltage between the traction battery and the motor or the external charging and discharging device.

According to a second aspect, this application provides an electric device including a control module and the voltage regulation circuit for traction battery according to any one of the embodiments of the first aspect; where the control module is connected to the switch module and the voltage regulation module, and is configured to control the voltage regulation module and the switch module to regulate the charge/discharge voltage between the traction battery and the power storage element and the charge voltage of the external charging and discharging device for the traction battery.

In the electric device provided in the embodiments of this application, the voltage regulation module and the switch module are controlled to switch between different charging and discharging loops, so as to flexibly and efficiently regulate, in response to the voltage regulation control signals under different charging and discharging requirements, the charge/discharge voltage between the traction battery and the power storage element and the charge voltage of the external charging and discharging device for the traction battery, thereby meeting the charge or discharge voltage requirements on the traction battery in different scenarios.

According to a third aspect, this application provides a voltage regulation system for traction battery including an external charging and discharging device and the electric device according to the second aspect, where the external charging and discharging device is connected to the charge/discharge interface in the electric device.

In the voltage regulation system for traction battery provided in the embodiments of this application, the voltage regulation module and the switch module are controlled to switch between different charging and discharging loops, so as to flexibly and efficiently regulate, in response to the voltage regulation control signals under different charging and discharging requirements, the charge/discharge voltage between the traction battery and the power storage element and the charge voltage of the external charging and discharging device for the traction battery, thereby meeting the charge or discharge voltage requirements on the traction battery in different scenarios.

According to a fourth aspect, this application provides a voltage regulation method for traction battery, applied to the voltage regulation system for traction battery according to the third aspect and including: obtaining an enabling signal from the control module; and controlling, according to the enabling signal, the voltage regulation module and the switch module to regulate the charge/discharge voltage between the traction battery and the power storage element; or controlling, according to the enabling signal, the voltage regulation module and the switch module to regulate the charge voltage of the external charging and discharging device for the traction battery.

In the voltage regulation method for traction battery provided in the embodiments of this application, the voltage regulation module and the switch module are controlled to switch between different charging and discharging loops, so as to flexibly and efficiently regulate, in response to the voltage regulation control signals under different charging and discharging requirements, the charge/discharge voltage between the traction battery and the power storage element and the charge voltage of the external charging and discharging device for the traction battery, thereby meeting the charge or discharge voltage requirements on the traction battery in different scenarios.

In some embodiments, the controlling, according to the enabling signal, the voltage regulation module and the switch module to regulate the charge/discharge voltage between the traction battery and the power storage element specifically includes: controlling the voltage regulation module and the switch module to enable the traction battery to charge the power storage element; or controlling the voltage regulation module and the switch module to enable the power storage element to charge the traction battery.

In the voltage regulation method for traction battery provided in the embodiments of this application, the voltage regulation module and the switch module are controlled, according to the enabling signal, to regulate the charge/discharge voltage between the traction battery and the power storage element, so as to regulate the driving power supply or battery self-heating mode between the traction battery and the power storage element as required.

In some embodiments, the switch module includes a charge-discharge switching module and a leg set, where the charge-discharge switching module is connected in parallel to the leg set, and the leg set includes three phase legs; and the voltage regulation module includes a first switch, a second switch, a third switch, a fourth switch, and a power storage regulation element. The controlling the voltage regulation module and the switch module to enable the traction battery to charge the power storage element specifically includes: controlling upper legs of two phase legs in the leg set and a lower leg of one phase leg in the leg set to be on, and the first switch, the second switch, the third switch, the fourth switch, and the charge-discharge switching module to be off; or controlling upper legs of two phase legs in the leg set, the second switching circuit of the charge-discharge switching module, and the first switch to be on, and the second switch, the third switch, and the fourth switch to be off.

In the voltage regulation method for traction battery provided in the embodiments of this application, the voltage regulation module and the switch module can be controlled to enable the traction battery to charge the power storage element. In addition, a redundant protection system can be formed by the legs of the charge-discharge switching module and the legs in the leg set. In the power storage element of a powertrain system, the first, second, and third legs in the leg set are electrically connected to a three-phase line of the motor for power output. If one leg is damaged, the leg of the charge-discharge switching module can be connected to the neutral point of the motor to establish a connection with the motor. If one or two of the first, second, and third legs have overcurrent or overvoltage damage, the power system can still perform emergency power output. Therefore, emergency power output can be implemented with one phase missing, avoiding power interruption.

In some embodiments, the switch module includes a charge-discharge switching module and a leg set, where the charge-discharge switching module is connected in parallel to the leg set; and the voltage regulation module includes a first switch, a second switch, a third switch, a fourth switch, and a power storage regulation element. The controlling the voltage regulation module and the switch module to enable the power storage element to charge the traction battery specifically includes: controlling all upper legs in the leg set, the second switching circuit of the charge-discharge switching module, and the first switch to be on, and the second switch, the third switch, and the fourth switch to be off.

In the voltage regulation method for traction battery provided in the embodiments of this application, the voltage regulation module and the switch module are controlled to enable the power storage element to charge the traction battery. The first switch disposed can provide protection for the power storage element and the traction battery during charging and discharging. The charge-discharge switching module can implement the battery self-heating. When the battery self-heating needs to be performed, the first switch is first closed to ensure establishment of electrical connection between the charge-discharge switching module and the neutral point of the motor. If a breakdown or short circuit occurs due to failure in the first switching circuit or the second switching circuit in the charge-discharge switching module in the heating mode, the switch K7 can be controlled to be off to avoid short circuit, ensuring that the neutral line of the disconnected motor is short-circuited to the positive electrode or negative electrode of the battery.

In some embodiments, the controlling, according to the enabling signal, the voltage regulation module and the switch module to regulate the charge voltage of the external charging and discharging device for the traction battery specifically includes: obtaining a first voltage of the traction battery and a second voltage of the external charging and discharging device; and controlling, according to the first voltage and the second voltage, the voltage regulation module and the switch module to regulate the charge voltage of the external charging and discharging device for the traction battery.

In the voltage regulation method for traction battery provided in the embodiments of this application, the charge voltage of the traction battery is flexibly regulated according to a relationship between the voltages of the charging device and the traction battery. In this way, the charging device can directly charge a traction battery with a voltage lower than an output voltage of the charging device and also boost charge a traction battery with a voltage higher than the output voltage of the charging device, so that charging of the traction battery is not limited by the maximum output voltage of the charging device.

In some embodiments, the controlling, according to the first voltage and the second voltage, the voltage regulation module and the switch module to regulate the charge voltage of the external charging and discharging device for the traction battery specifically includes: when the first voltage is less than or equal to the second voltage, controlling the voltage regulation module and the switch module to enable the external charging and discharging device to charge the traction battery; and when the first voltage is greater than the second voltage, controlling the voltage regulation module and the switch module to increase the charge voltage of the external charging and discharging device for charging the traction battery.

In the voltage regulation method for traction battery provided in the embodiments of this application, with the circuit structure unchanged, the voltage regulation module and the switch module can be controlled, according to a magnitude relationship between the first voltage of the traction battery and the second voltage of the external charging and discharging device, to regulate the charge voltage of the external charging and discharging device for the traction battery, so that the external charging and discharging device directly charges the traction battery or the charge voltage of the external charging and discharging device for charging the traction battery is increased.

In some embodiments, the switch module includes a charge-discharge switching module and a leg set, where the charge-discharge switching module is connected in parallel to the leg set, and the leg set includes three phase legs; and the voltage regulation module includes a first switch, a second switch, a third switch, a fourth switch, and a power storage regulation element. The controlling the voltage regulation module and the switch module to enable the external charging and discharging device to charge the traction battery specifically includes: controlling the third switch and the fourth switch to be on, and the first switch, the second switch, and the switch module to be off.

In the voltage regulation method for traction battery provided in the embodiments of this application, with the circuit structure unchanged, when the voltage of the battery is less than or equal to the output voltage, the voltage regulation module and the switch module can be controlled to regulate the charge voltage of the external charging and discharging device for the traction battery, so that the external charging and discharging device directly charges the traction battery.

In some embodiments, the switch module includes a charge-discharge switching module and a leg set, where the charge-discharge switching module is connected in parallel to the leg set, and the leg set includes three phase legs; and the voltage regulation module includes a first switch, a second switch, a third switch, a fourth switch, and a power storage regulation element. The controlling the voltage regulation module and the switch module to increase the charge voltage of the external charging and discharging device for charging the traction battery specifically includes: controlling the second switch, the third switch, and all upper legs in the leg set to be on, and the first switch, the fourth switch, and the charge-discharge switching module to be off.

In the voltage regulation method for traction battery provided in the embodiments of this application, with the circuit structure unchanged, when the voltage of the battery is greater than the output voltage, the voltage regulation module and the switch module can be controlled to regulate the charge voltage of the external charging and discharging device for the traction battery, so as to increase the charge voltage of the external charging and discharging device for charging the traction battery.

According to a fifth aspect, this application provides a voltage regulation device for traction battery including: a memory configured to store executable instructions; and a processor configured to be connected to the memory to execute the executable instructions to implement the voltage regulation method for traction battery according to any one of the embodiments of the fourth aspect.

In the voltage regulation device for traction battery provided in the embodiments of this application, the voltage regulation module and the switch module are controlled to switch between different charging and discharging loops, so as to flexibly and efficiently regulate, in response to the voltage regulation control signals under different charging and discharging requirements, the charge/discharge voltage between the traction battery and the power storage element and the charge voltage of the external charging and discharging device for the traction battery, thereby meeting the charge or discharge voltage requirements on the traction battery in different scenarios.

According to a sixth aspect, this application provides a computer-readable storage medium, where the computer-readable storage medium stores a computer program, and the computer program is executed by a processor to implement the voltage regulation method for traction battery according to any one of the embodiments of the fourth aspect.

In the computer-readable storage medium provided in the embodiments of this application, the voltage regulation module and the switch module are controlled to switch between different charging and discharging loops, so as to flexibly and efficiently regulate, in response to the voltage regulation control signals under different charging and discharging requirements, the charge/discharge voltage between the traction battery and the power storage element and the charge voltage of the external charging and discharging device for the traction battery, thereby meeting the charge or discharge voltage requirements on the traction battery in different scenarios.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following descriptions show merely some embodiments of this application, and persons of ordinary skill in the art may still derive other drawings from the accompanying drawings without creative efforts.

Figure 1:
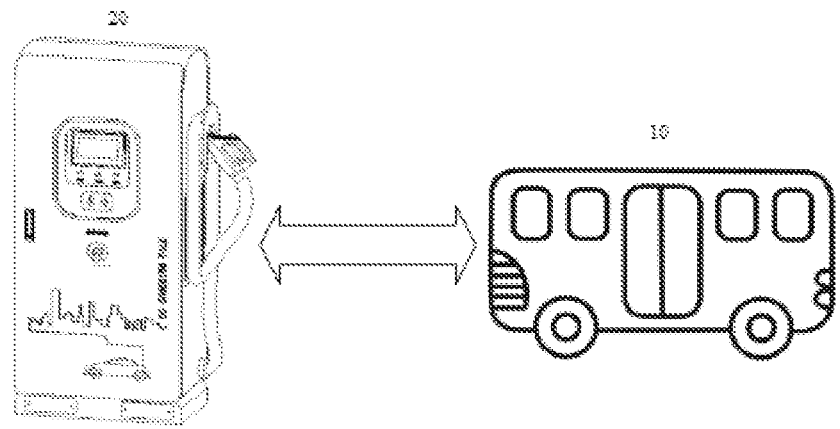
FIG. 1 is a schematic diagram of an application architecture of a charging method according to an embodiment of this application.

In the accompanying drawings, the figures are not drawn to scale.

DETAILED DESCRIPTION

The following further describes the implementations of this application in detail with reference to the accompanying drawings and embodiments. The following detailed description of embodiments and the accompanying drawings are intended to illustrate the principle of this application rather than to limit the scope of this application, meaning this application is not limited to the embodiments as described.

In the descriptions of this application, it should be noted that, unless otherwise stated, "a plurality of" means more than two; and the orientations or positional relationships indicated by the terms "upper", "lower", "left", "right", "inside", "outside", and the like are merely for ease and brevity of description of this application rather than indicating or implying that the apparatuses or elements mentioned must have specific orientations or be constructed and manipulated according to specific orientations, and therefore shall not be construed as any limitations on this application. In addition, the terms "first", "second", "third", and the like are merely for the purpose of description and shall not be understood as any indication or implication of relative importance. "Perpendicular" is not perpendicular in the strict sense but within an allowable range of error. "Parallel" is not parallel in the strict sense but within an allowable range of error.

The orientation terms appearing in the following description all refer to directions shown in the figures, and do not limit the specific structure of this application. In the description of this application, it should also be noted that unless otherwise specified and defined explicitly, the terms "mount", "connect", and "join" should be understood in their general senses. For example, they may refer to a fixed connection, a detachable connection, or an integral connection; and a direct connection or an indirect connection via an intermediate medium. Persons of ordinary skill in the art can understand specific meanings of these terms in this application as appropriate to specific situations.

With the development of battery technologies, various performance parameters of traction batteries are constantly improving. In particular, total voltage of the traction batteries is generally increased significantly. However, currently, to improve adaptability of electric vehicles in cold regions, most of them employ traction battery self-heating technology. To improve universal adaptability of traction batteries, how charge/discharge voltages of traction batteries are flexibly adjusted in different scenarios is an urgent problem to be solved.

In addition, the maximum output voltage of a charging device currently used is lower than a charge voltage required by a new traction battery with a high voltage, so it is difficult for the traction battery to adjust the output voltage as required by different load devices. Therefore, how charge/discharge voltages of traction batteries are flexibly adjusted in different scenarios is also an urgent problem to be solved.

In view of this, an embodiment of this application provides a voltage regulation system for traction battery and a control method and control apparatus thereof. The voltage regulation system for traction battery includes a traction battery, a heating module, a charge/discharge interface, and a voltage regulation module, where the heating module includes a power storage element and a switch module; the traction battery is connected in parallel to the switch module; an external charging and discharging device is connected in parallel to the traction battery through the charge/discharge interface; the voltage regulation module includes a plurality of switches and a power storage regulation element, and the plurality of switches and the power storage regulation element are disposed between the charge/discharge interface and the traction battery; and the voltage regulation module and the switch module are configured to regulate, in response to a voltage regulation control signal, a charge/discharge voltage between the traction battery and the power storage element and a charge voltage of the external charging and discharging device for the traction battery.

The traction battery in this embodiment of this application may be a lithium-ion battery, a lithium metal battery, a lead-acid battery, a nickel-cadmium battery, a nickel-metal hydride battery, a lithium-sulfur battery, a lithium-air battery, a sodium-ion battery, or the like. This is not limited herein. In terms of scale, the battery in this embodiment of this application may be a battery cell, or may be a battery module or a battery pack. This is not limited herein. In terms of application scenarios, the battery may be used in power apparatuses such as an automobile and a ship. For example, the battery may be used in an electric vehicle to power a motor of the electric vehicle as a power source for the electric vehicle. The battery may also power other electric components in the electric vehicle, such as powering an in-car air conditioner, an in-car player, and the like.

For ease of description, the following uses an example in which a traction battery is used in a new energy vehicle (electric vehicle) for description.

A drive motor and its control system is one of core components of a new energy vehicle, and its driving characteristics determine main performance indicators of the vehicle in driving. A motor drive system of the new energy vehicle is mainly composed of an electric motor (that is, a motor), a power converter, a motor controller (for example, an inverter), various detection sensors, a power supply, and the like. The motor is a rotating electromagnetic machine that operates on the principle of electromagnetic induction, and is used to convert electrical energy into mechanical energy. During operation, the motor takes electric power from the electrical system and outputs mechanical power to a mechanical system.

FIG. 1 is a schematic diagram of an application architecture to which a charging method according to an embodiment of this application is applicable. The application architecture includes a battery management system (BMS) 10 and a charging pile 20. The BMS 10 can be connected to the charging pile 20 through a communication cable to exchange information with the charging pile 20. For example, the communication cable may be a controller area network (CAN) communication cable or a daisy chain communication cable.

The BMS 10 is a BMS of the traction battery, and the traction battery is a battery for providing a power source for an electric apparatus. Optionally, the traction battery may be a traction storage battery. In terms of category of battery, the traction battery may be a lithium-ion battery, a lithium metal battery, a lead-acid battery, a nickel-cadmium battery, a nickel-metal hydride battery, a lithium-sulfur battery, a lithium-air battery, a sodium-ion battery, or the like. This is not specifically limited in the embodiments of this application. In terms of scale of battery, the traction battery in the embodiments of this application may be a cell/battery cell, or may be a battery module or a battery pack. This is not specifically limited in the embodiments of this application. Optionally, the electric apparatus may be a vehicle, a ship, a spacecraft, or the like. This is not limited in the embodiments of this application. The BMS is a control system that ensures safe use of a traction battery, and implements functions such as charge and discharge management, high voltage control, battery protection, battery data collection, and battery state evaluation. The BMS may be integrated with the traction battery into one device/apparatus, or may be disposed as an independent device/apparatus outside the traction battery.

The charging pile 20, also referred to as a charger, is an apparatus for charging a traction battery. The charging pile can output charging power according to charging requirements of the BMS 10 to charge the traction battery. For example, the charging pile 20 can output voltage and current according to the required voltage and current sent by the BMS 10.

To meet the charge voltage requirements on the traction battery in different scenarios, this application provides a voltage regulation system for traction battery.

Figure 2:
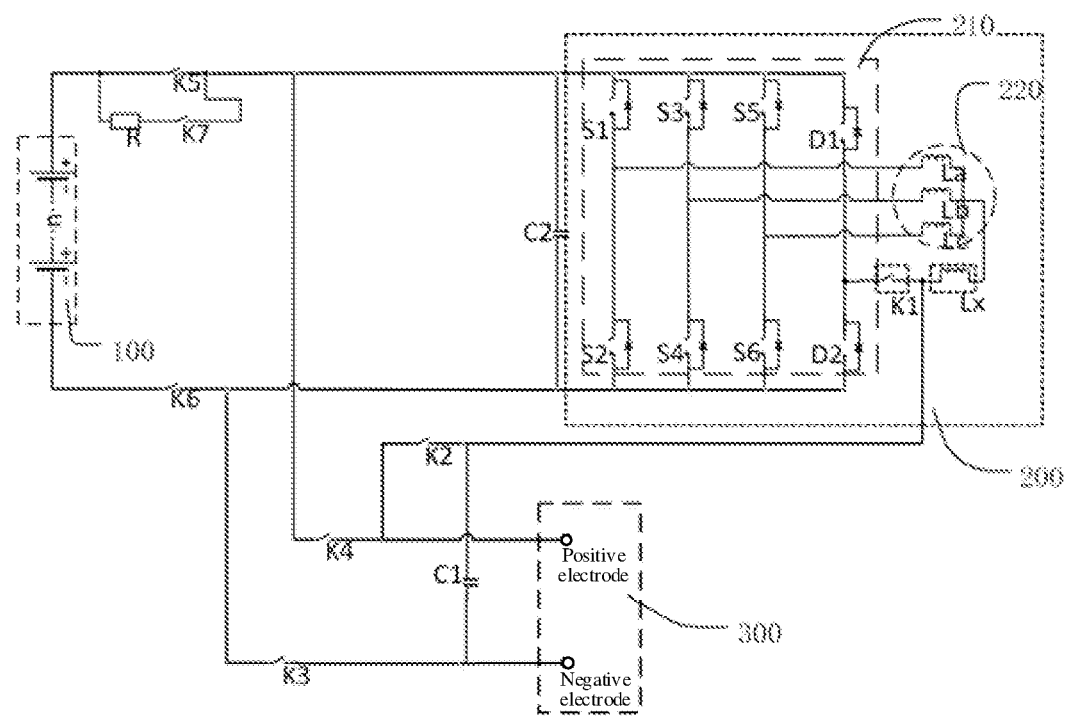
FIG. 2 is a circuit diagram of a voltage regulation circuit for traction battery according to an embodiment of this application.

FIG. 2 is a schematic block diagram of a voltage regulation circuit 1 for a traction battery 100 according to an embodiment of this application.

As shown in FIG. 2, this application provides the voltage regulation circuit for the traction battery 100 including the traction battery 100, a heating module 200, a charge/discharge interface 300, and a voltage regulation module.

The heating module 200 includes a power storage element 220 and a switch module 210. The traction battery 100 is connected in parallel to the switch module 210, and an external charging and discharging device is connected in parallel to the traction battery 100 through the charge/discharge interface 300.

The voltage regulation module includes a plurality of switches and a power storage regulation element, and the plurality of switches and the power storage regulation element are disposed between the charge/discharge interface 300 and the traction battery 100.

The voltage regulation module and the switch module 210 are configured to regulate, in response to a voltage regulation control signal, a charge/discharge voltage between the traction battery 100 and the power storage element 220 and a charge/discharge voltage between the traction battery 100 and the external charging and discharging device.

In the voltage regulation circuit for the traction battery 100 provided in the embodiments of this application, the voltage regulation module and the switch module 210 are controlled to switch between different charging and discharging loops, so as to flexibly and efficiently regulate, in response to the voltage regulation control signals under different charging and discharging requirements, the charge/discharge voltage between the traction battery 100 and the power storage element 220 and the charge/discharge voltage between the traction battery 100 and the external charging and discharging device, thereby meeting the charge or discharge voltage requirements on the traction battery 100 in different scenarios.

In a specific implementation, the voltage regulation module includes a first switch K1, a second switch K2, a third switch K3, a fourth switch K4, and the power storage regulation element; the first switch K1 is disposed between the power storage element 220 and the switch module 210; the second switch K2 is disposed between the power storage element 220 and the charge/discharge interface 300; the third switch K3 and the fourth switch K4 are respectively disposed on a negative electrode side and a positive electrode side of the charge/discharge interface 300; and the power storage regulation element is disposed between the power storage element 220 and the switch module 210 and also between the power storage element 220 and the charge/discharge interface 300.

Based on this, in the voltage regulation circuit for the traction battery 100 in this implementation, the switches are disposed at different positions in the charging and discharging loops of the traction battery 100, so as to achieve a purpose of switching between different charging and discharging loops.

In addition, different switches in the voltage regulation module and the switch module 210 can be controlled to be on or off, so as to form, in one circuit structure, driving power supply and battery self-heating modes between the traction battery 100 and the power storage element 220 and boost charging and direct charging modes between the traction battery 100 and the external charging and discharging device, thereby meeting the charge or discharge voltage requirements on the traction battery 100 in different scenarios.

In a further specific implementation, as shown in FIG. 2, one terminal of the first switch K1 is connected to the switch module 210, the other terminal of the first switch K1 is connected to a first terminal of the power storage regulation element, and a second terminal of the power storage regulation element is connected to the power storage element 220; the first terminal of the power storage regulation element is also connected to one terminal of the second switch K2 and the negative electrode side of the charge/discharge interface 300, and the other terminal of the second switch K2 is connected to the positive electrode side of the charge/discharge interface 300; the third switch K3 is disposed between the negative electrode side of the charge/discharge interface 300 and a negative electrode side of the traction battery 100; and the fourth switch K4 is disposed between the positive electrode side of the charge/discharge interface 300 and a positive electrode side of the traction battery 100.

Based on this, in the voltage regulation circuit for the traction battery 100 in this implementation, the switches are disposed at different positions in the charging and discharging loops of the traction battery 100, so as to achieve a purpose of switching between different charging and discharging loops. Different switches in the voltage regulation module and the switch module 210 can be controlled to be on or off, so as to form, in one circuit structure, the driving power supply and battery self-heating modes between the traction battery 100 and the power storage element 220 and the boost charging and direct charging modes between the traction battery 100 and the external charging and discharging device, thereby meeting the charge or discharge voltage requirements on the traction battery 100 in different scenarios.

In some embodiments, the switch module 210 includes a charge-discharge switching module and a leg set connected in parallel, where a first terminal of the power storage element 220 is connected to the leg set, a second terminal of the power storage element 220 is connected to the second terminal of the power storage regulation element, the first terminal of the power storage regulation element is connected to one terminal of the first switch K1, and the other terminal of the first switch K1 is connected to the charge-discharge switching module.

Based on this, the voltage regulation circuit for the traction battery 100 in this implementation stores and supplies energy through the charge-discharge switching module and the leg set during charging and discharging under different charging and discharging requirements, ensuring the driving power supply and battery self-heating between the traction battery 100 and the power storage element 220 and the boost charging and direct charging between the traction battery 100 and the external charging and discharging device.

Specifically, as shown in FIG. 2, a first capacitor is provided between the first terminal of the power storage regulation element and the negative electrode side of the charge/discharge interface 300.

Further, in the boost charging mode, the first capacitor is used to stabilize the voltage between the first terminal of the power storage regulation element and the negative electrode side of the charge/discharge interface 300. In addition, a positive electrode of the first capacitor is connected to the middle between the second switch K2 and the power storage regulation element. When the fourth switch K4 is closed and the second switch K2 is not closed, the current is input from the charge/discharge interface 300 for charging, and the first capacitor does not work, thereby avoiding affecting direct charging for the traction battery 100 by the external charging and discharging device.

Further limitedly, as shown in FIG. 2, the power storage regulation element is an inductive element.

Based on this, in the voltage regulation circuit for the traction battery 100 in this implementation, the inductive element is disposed on the first terminal of the power storage regulation element, that is, on a neutral connection line of the motor, and inductance of the inductive element can be designed according to actual inductance of a motor winding of a specific motor model.

When a value of the inductive element is 0 or no inductor is disposed, the motor needs no additional increase in weight and volume of the inductive element, and thus has advantages of light-weighting and low costs. When a value of the inductive element is not 0 or no inductor is disposed, because energy is transferred between the battery and the inductor of the motor during the battery self-heating, setting a specific inductance value for the inductive element in this case increases energy stored in the inductor of the motor, thereby optimizing current and frequency parameters during the battery self-heating and improving the effect of the battery self-heating.

As shown in FIG. 2, the switch module 210 includes a charge-discharge switching module and a leg set connected in parallel, where a first terminal of the power storage element 220 is connected to the leg set, and a second terminal of the power storage element 220 is connected to the charge-discharge switching module.

The leg set includes a first leg formed by an upper leg S1 and a lower leg S2, a second leg formed by an upper leg S3 and a lower leg S4, and a third leg formed by an upper leg S5 and a lower leg S6.

The charge-discharge switching module includes a first switching circuit D1 and a second switching circuit D2.

Further, energy is stored and supplied through the charge-discharge switching module and the leg set during charging and discharging, ensuring the driving power supply and battery self-heating between the traction battery 100 and the power storage element 220 and the boost charging and direct charging between the traction battery 100 and the external charging and discharging device.

In some embodiments, the power storage element 220 includes an M-phase motor; and the leg set includes M phase legs, M being a positive integer.

M phase windings of the M-phase motor are connected to joints between upper legs and lower legs of all of the M phase legs in one-to-one correspondence; and the charge-discharge switching module includes the first switching circuit D1 and the second switching circuit D2 connected in series, and a joint between the first switching circuit D1 and the second switching circuit D2 is connected to a neutral point of the M-phase motor.

Based on this, the voltage regulation circuit for the traction battery 100 in this implementation stores and supplies energy through the charge-discharge switching module and the leg set during charging and discharging, ensuring the driving power supply and battery self-heating between the traction battery 100 and the power storage element 220 and the boost charging and direct charging between the traction battery 100 and the external charging and discharging device. The charge-discharge switching module further ensures free switching between charging and discharging between the battery and the motor and between the battery and the external device.

In some embodiments, as shown in FIG. 2, both the first switching circuit D1 and the second switching circuit D2 include a triode and a flyback diode connected in parallel.

The voltage regulation circuit for the traction battery 100 provided in the embodiments of this application improves efficiency of free switching by the charge-discharge switching module between charging and discharging between the battery and the motor and between the battery and the external device through the triode and the flyback diode connected in parallel.

In other implementations, both the first switching circuit D1 and the second switching circuit D2 include a triode or a relay switch.

In this case, the efficiency of free switching by the charge-discharge switching module between charging and discharging between the battery and the motor and between the battery and the external device is improved through the triode or the relay switch.

In other implementations, not shown in the figure, the first switching circuit D1 includes a diode and the second switching circuit D2 includes a switch; or the first switching circuit D1 includes a switch and the second switching circuit D2 includes a diode.

In this case, the efficiency of free switching by the charge-discharge switching module between charging and discharging between the battery and the motor and between the battery and the external device is improved through a free combination and parallel connection of the diode and the switch.

As shown in FIG. 2, in some embodiments, a first switch K1 and an inductor are provided between the joint between the first switching circuit D1 and the second switching circuit D2 and the neutral point of the M-phase motor.

In this case, flexible switching between the first switching circuit D1 and the second switching circuit D2 in the charge-discharge switching module and the neutral point of the motor is implemented through the first switch K1, ensuring free switching between the battery self-heating and the driving power supply.

As shown in FIG. 2, in some embodiments, a second capacitor C2 is connected in parallel to the traction battery 100.

In this case, the voltage across the traction battery 100 is stabilized through the second capacitor, ensuring the stable and continuous voltage between two terminals of the traction battery 100 or the charge/discharge interface 300 during charging and discharging.

As shown in FIG. 2, a fifth switch K5 is provided on the positive electrode side of the traction battery 100, and a sixth switch K6 is provided on the negative electrode side of the traction battery 100.

In this case, switching between different circuit loops under different requirements is flexibly implemented through the switches on the positive and negative electrode sides of the traction battery 100.

In some embodiments, the fifth switch K5 is connected in parallel to a branch, and the branch includes a resistor and a seventh switch K7 connected in series. In this case, the branch in which the resistor and the seventh switch K7 are connected in series flexibly coordinates with the fifth switch K5, thereby accurately regulating the charge/discharge voltage between the traction battery 100 and the motor or the external charging and discharging device.

In addition, refer to FIG. 2. The circuit is further described as follows.

The first switch K1, the second switch K2, the third switch K3, and the fourth switch K4 in the voltage regulation module may be relay switches, and the inductive element Lx is an adjustable inductor. A control module controls these switches to be on or off to form different loops.

The first switch K1 is configured to connect or disconnect the three-phase center point of the motor and the charge-discharge switching module.

The first switch K1 and the inductive element Lx are connected in series and then disposed between the three-phase center point of the motor and the charge-discharge switching module. In addition, with two wires led out at the joint between the first switch K1 and the inductive element Lx, one wire is connected to the second switch K2 and then to the positive electrode side of the charge/discharge interface 300, and the other wire is connected to the first capacitor C1 and then to the negative electrode side of the charge/discharge interface 300.

The second switch K2 is configured to connect or disconnect the three-phase center point of the motor and the positive electrode side of the charge/discharge interface 300.

The third switch K3 is configured to connect or disconnect the negative electrode side of the traction battery 100 and the negative electrode side of the charge/discharge interface 300. The fourth switch K4 is configured to connect or disconnect the positive electrode side of the traction battery 100 and the positive electrode side of the charge/discharge interface 300.

The leg set and the charge-discharge switching module may be implemented by an inverter in a motor drive system, and the inverter may be implemented by a leg switch of an insulated gate bipolar transistor (IGBT). The legs in the leg set are the same as the inductors in the motor in quantity. For example, the motor is a three-phase motor, and the inverter includes three phase legs, which are a U-phase leg, a V-phase leg, and a W-phase leg. Each of the three phase legs has an upper leg and a lower leg, and the upper leg and the lower leg each are provided with a switch unit, meaning that the leg set includes an upper leg switch and a lower leg switch in the U-phase leg, an upper leg switch and a lower leg switch in the V-phase leg, and an upper leg switch and a lower leg switch in the W-phase leg. The charge-discharge switching module also has an upper leg and a lower leg, and the upper leg and the lower leg each are provided with a switch unit, meaning that the charge-discharge switching module includes a first switching circuit D1 switch and a second switching circuit D2 switch.

The motor may include a plurality of inductors. For example, the three-phase motor may include three inductors, and may specifically include an inductor La connected to the U-phase leg, an inductor Lb connected to the V-phase leg, and an inductor Lc connected to the W-phase leg. One terminal of the inductor La is connected to a joint between the upper leg and the lower leg in the U-phase leg, one terminal of the inductor Lb is connected to a joint between the upper leg and the lower leg in the V-phase leg, and one terminal of the inductor Lc is connected to a joint between the upper leg and the lower leg in the W-phase leg. The other terminal of the inductor La, the other terminal of the inductor Lb, and the other terminal of the inductor Lc are connected together at a joint, and the joint is the three-phase center point of the motor.

It should be noted that the motor is not limited to the three-phase motor, and may alternatively be a six-phase motor. Correspondingly, the six-phase motor may include six phase legs.

Optionally, the voltage regulation system for the traction battery 100 may further be provided with the fifth switch K5, the sixth switch K6, the seventh switch K7, the first capacitor C1, the second capacitor C2, and the resistor R.

The fifth switch K5 is disposed between the positive electrode side of the traction battery 100 and a joint of all upper legs in the leg set. In this embodiment of this application, the fifth switch K5 may remain in a closed state.

The sixth switch K6 is disposed between the negative electrode side of the traction battery 100 and a joint of all lower legs in the leg set. The sixth switch K6 is also disposed between the negative electrode side of the traction battery 100 and the negative electrode side of the charge/discharge interface 300. In this embodiment of this application, the sixth switch K6 may remain in a closed state.

The seventh switch K7 and the resistor R are connected in series and then in parallel to the fifth switch K5.

One terminal of the first capacitor C1 is connected to the three-phase center point of the motor through the inductive element Lx, and the other terminal of the first capacitor C1 is connected to the negative electrode side of the charge/discharge interface 300. The second capacitor C2 is connected in parallel to the traction battery 100. In addition, one terminal of the second capacitor C2 is connected to the joint of all upper legs in the leg set, and the other terminal of the second capacitor C2 is connected to the joint of all lower legs.

Both the first capacitor C1 and the second capacitor C2 can stabilize the voltage, filter the clutter, and the like.

In the voltage regulation system for the traction battery 100 provided in the embodiments of this application, the voltage regulation module and the switch module 210 are controlled to switch between different charging and discharging loops, so as to flexibly and efficiently regulate, in response to the voltage regulation control signals under different charging and discharging requirements, the charge/discharge voltage between the traction battery 100 and the power storage element 220 and the charge/discharge voltage between the traction battery 100 and the external charging and discharging device, thereby meeting the charge or discharge voltage requirements on the traction battery 100 in different scenarios.

Figure 3:
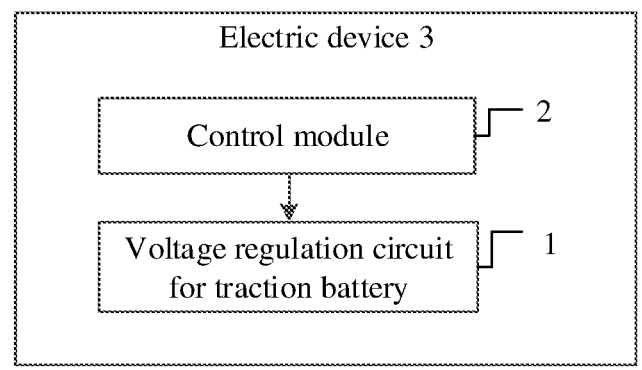
FIG. 3 is a schematic block diagram of an electric device according to an embodiment of this application.

FIG. 3 is a schematic block diagram of an electric device 3 according to an embodiment of this application.

As shown in FIG. 3, the electric device 3 includes a control module 2 and the voltage regulation circuit 1 for the traction battery 100.

The control module 2 is connected to the switch module 210 and the voltage regulation module, and is configured to control the voltage regulation module and the switch module 210 to regulate the charge/discharge voltage between the external charging and discharging device and the traction battery 100.

Optionally, an apparatus for obtaining a voltage of a battery and an output voltage may be a BMS in the control module, and an apparatus for controlling the switches in the switch module 210 to be on or off may be a micro control unit (MCU) in the control module, or may be a motor controller. The BMS can compare the obtained voltage of the battery and output voltage to determine a charging manner, and communicate with the MCU. For example, when the voltage of the battery is less than the output voltage, the BMS sends first information to the MCU, where the first information is used to indicate that charging is performed in a direct charging manner, and the MCU can control, based on the first information, a corresponding switch to be on or off to form a charging loop for direct charging.

Based on this, in the electric device provided in this implementation, the voltage regulation module and the switch module 210 are controlled to switch between different charging and discharging loops, so as to flexibly and efficiently regulate, in response to the voltage regulation control signals under different charging and discharging requirements, the charge/discharge voltage between the traction battery 100 and the power storage element 220 and the charge/discharge voltage between the traction battery 100 and the external charging and discharging device, thereby meeting the charge or discharge voltage requirements on the traction battery 100 in different scenarios.

Figure 4:
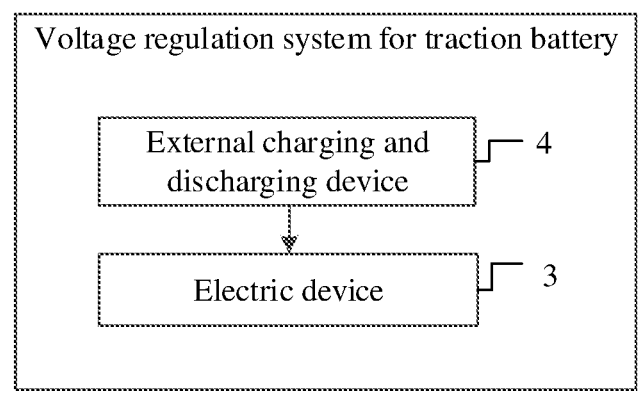
FIG. 4 is a schematic block diagram of a voltage regulation system for traction battery according to an embodiment of this application.

FIG. 4 is a schematic block diagram of a voltage regulation system for traction battery according to an embodiment of this application.

As shown in FIG. 4, this application provides a voltage regulation system for traction battery including an external charging and discharging device 4 and the electric device 3, where the external charging and discharging device 4 is connected to the charge/discharge interface 300 in the electric device 3.

Based on this, in the voltage regulation system for traction battery provided in the embodiments of this application, the voltage regulation module and the switch module are controlled to switch between different charging and discharging loops, so as to flexibly and efficiently regulate, in response to the voltage regulation control signals under different charging and discharging requirements, the charge/discharge voltage between the traction battery and the power storage element and the charge voltage of the external charging and discharging device for the traction battery, thereby meeting the charge or discharge voltage requirements on the traction battery in different scenarios.

Figure 5:
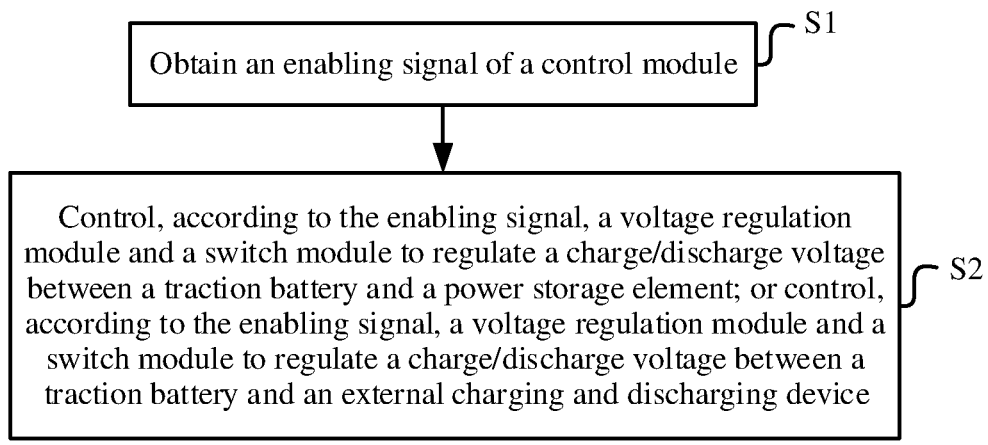
FIG. 5 is a schematic flowchart of a control method of a voltage regulation system for traction battery according to an embodiment of this application.

FIG. 5 is a schematic flowchart of a control method of a voltage regulation system for traction battery according to an embodiment of this application.

As shown in FIG. 5, the voltage regulation method for traction battery is applied to the voltage regulation system for traction battery, and specifically includes the following steps.

S1. Obtain an enabling signal from a control module.

S2. Control, according to the enabling signal, a voltage regulation module and a switch module to regulate a charge/discharge voltage between a traction battery and a power storage element; or control, according to the enabling signal, a voltage regulation module and a switch module to regulate a charge voltage of an external charging and discharging device for a traction battery.

Based on this, in the voltage regulation method for traction battery in this implementation, the voltage regulation module and the switch module are controlled to switch between different charging and discharging loops, so as to flexibly and efficiently regulate, in response to the voltage regulation control signals under different charging and discharging requirements, the charge/discharge voltage between the traction battery and the power storage element and the charge voltage of the external charging and discharging device for the traction battery, thereby meeting the charge or discharge voltage requirements on the traction battery in different scenarios.

Figure 6:
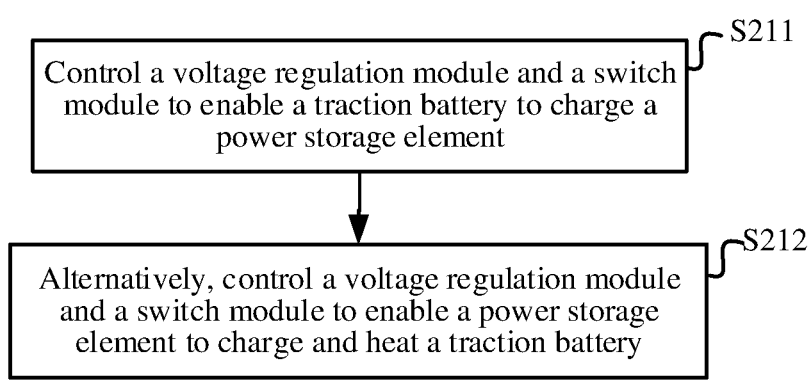
FIG. 6 is a schematic flowchart of a control method of a voltage regulation system for traction battery according to another embodiment of this application.

In an implementation scenario, as shown in FIG. 6, the controlling, according to the enabling signal, a voltage regulation module and a switch module to regulate a charge/discharge voltage between a traction battery and a power storage element specifically includes the following steps.

S211. Control the voltage regulation module and the switch module to enable the traction battery to charge the power storage element.

S212. Alternatively, control the voltage regulation module and the switch module to enable the power storage element to charge the traction battery.

In the voltage regulation method for traction battery provided based on this, the voltage regulation module and the switch module can be controlled, according to the enabling signal, to regulate the charge/discharge voltage between the traction battery and the power storage element, so as to regulate the driving power supply or battery self-heating mode between the traction battery and the power storage element as required.

Further, in the voltage regulation method for traction battery, step S211 of controlling the voltage regulation module and the switch module to enable the traction battery to charge the power storage element implements the function of charging while driving. This step specifically includes the following motions.

Motion 1. Control upper legs of two phase legs in a leg set and a lower leg of one phase leg in the leg set to be on, and a first switch, a second switch, a third switch, a fourth switch, and a charge-discharge switching module to be off.

Alternatively, motion 2. Control upper legs of two phase legs in a leg set, a second switching circuit of a charge-discharge switching module, and a first switch to be on, and a second switch, a third switch, and a fourth switch to be off.

Figure 7:
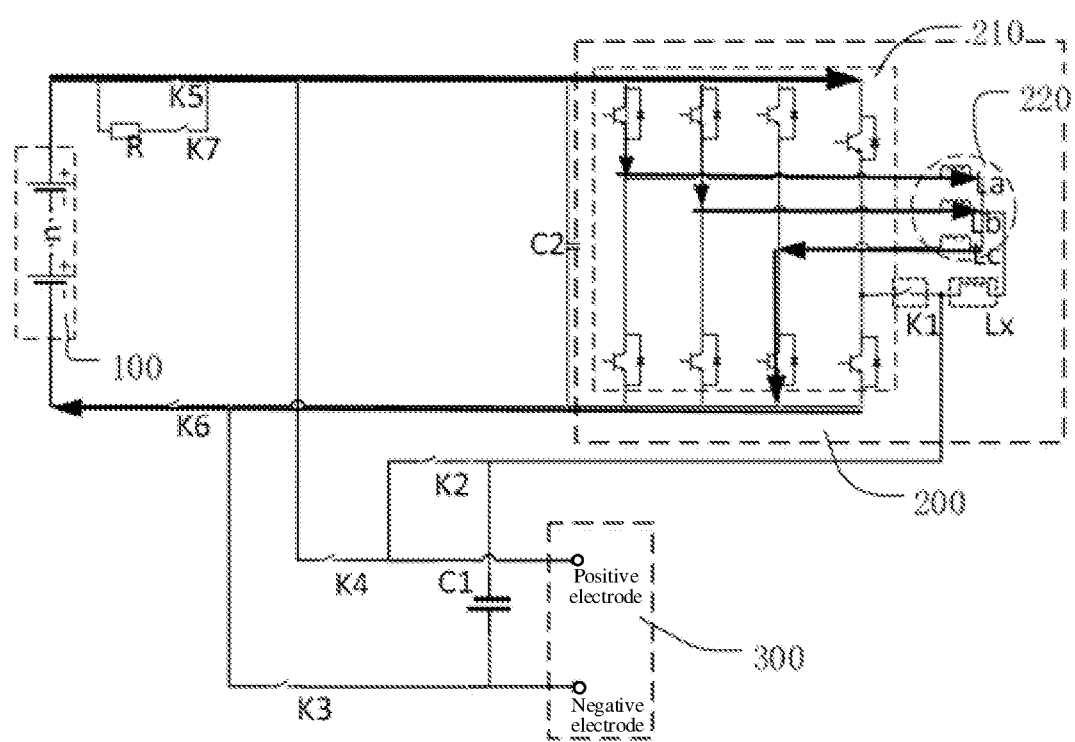
FIG. 7, FIG. 8, and FIG. 9 are schematic diagrams of different charging loops of a voltage regulation system for traction battery for charging a traction battery according to embodiments of this application.

FIG. 7 is a schematic diagram of a charging loop of a voltage regulation system for traction battery corresponding to motion 1 in the regulation method in this case.

Figure 8:
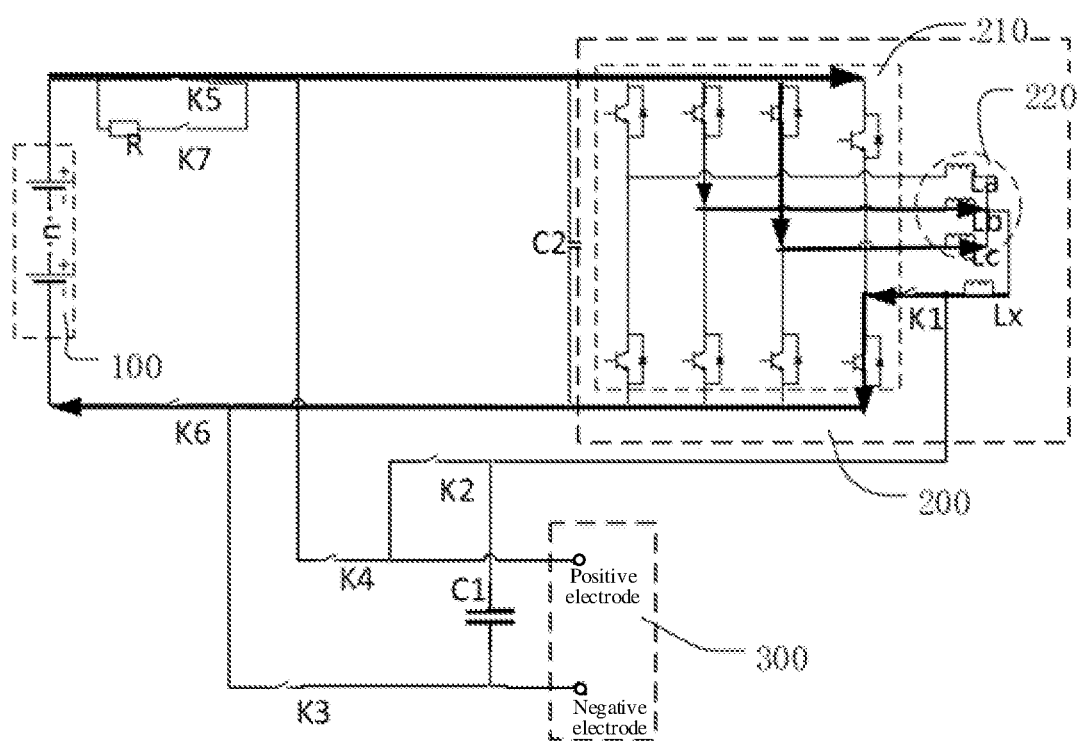

FIG. 8 is a schematic diagram of a charging loop of a voltage regulation system for traction battery corresponding to motion 2 in the regulation method in this case.

As shown in FIG. 7 and FIG. 8, a loop can be formed for the traction battery to charge the power storage element.

In the voltage regulation method for traction battery in this implementation, the voltage regulation module and the switch module can be controlled to enable the traction battery to charge the power storage element.

In motion 2 in the voltage regulation method for traction battery, a redundant protection system can be formed by the legs of the charge-discharge switching module and the legs in the leg set. For example, in the power storage element of a powertrain system, the first, second, and third legs in the leg set are electrically connected to a three-phase line of the motor for power output. If one leg is damaged, the leg of the charge-discharge switching module can be connected to the neutral point of the motor to establish a connection with the motor for driving inverter, so as to maintain power output of the vehicle. In this case, the first switch K1 is closed. Similarly, if the second and third legs fail, due to the characteristics of this high-voltage system, the legs of the charge-discharge switching module can quickly replace the faulty legs for operation.

In this case, if one or two of the first, second, and third legs have overcurrent or overvoltage damage, the power system can still perform emergency power output. Therefore, emergency power output can be implemented with one phase missing, avoiding power interruption.

Further, in the voltage regulation method for traction battery, step S212 of controlling the voltage regulation module and the switch module to enable the power storage element to charge the traction battery specifically includes: controlling all upper legs in the leg set, the second switching circuit of the charge-discharge switching module, and the first switch to be on, and the second switch, the third switch, and the fourth switch to be off.

Figure 9:
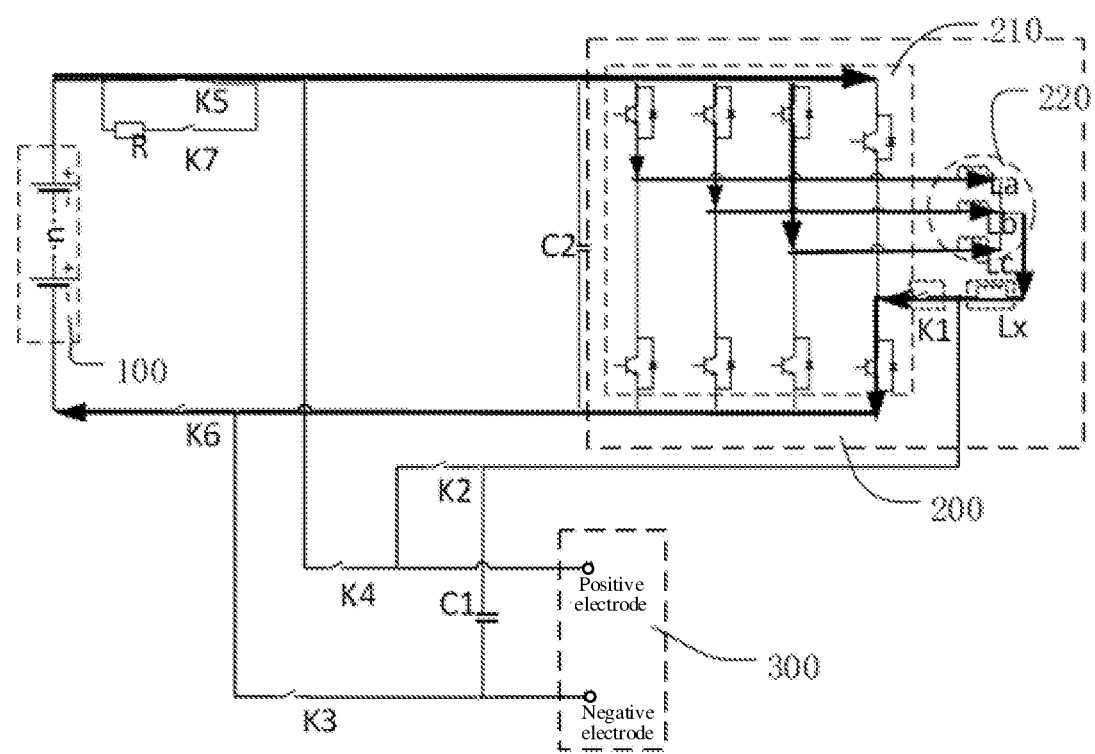

FIG. 9 is a schematic diagram of a charging loop of a voltage regulation system for traction battery corresponding to motion 1 in the regulation method in this case.

As shown in FIG. 9, a circuit loop can be formed for traction battery self-heating.

Based on the voltage regulation method for traction battery in this implementation, the voltage regulation module and the switch module are controlled to enable the power storage element to charge the traction battery. The first switch disposed can provide protection for the power storage element and the traction battery during charging and discharging.

Further, the charge-discharge switching module can implement the battery self-heating. When the battery self-heating needs to be performed, the first switch is first closed to ensure establishment of electrical connection between the charge-discharge switching module and the neutral point of the motor. If a breakdown or short circuit occurs due to failure in the first switching circuit or the second switching circuit in the charge-discharge switching module in the heating mode, the switch K7 can be controlled to be off to avoid short circuit, ensuring that the neutral line of the disconnected motor is short-circuited to the positive electrode or negative electrode of the battery.

Figure 10:
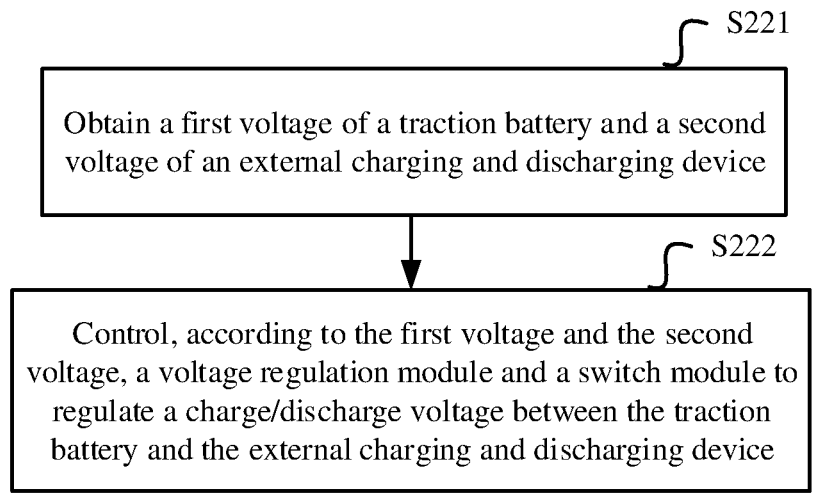
FIG. 10 is a schematic flowchart of a control method of another voltage regulation system for traction battery according to an embodiment of this application.

In another implementation scenario, as shown in FIG. 10, the controlling, according to the enabling signal, a voltage regulation module and a switch module to regulate a charge voltage of an external charging and discharging device for a traction battery specifically includes the following steps.

S221. Obtain a first voltage of the traction battery and a second voltage of the external charging and discharging device.

S222. Control, according to the first voltage and the second voltage, the voltage regulation module and the switch module to regulate the charge voltage of the external charging and discharging device for the traction battery.

Based on the voltage regulation method for traction battery provided in this implementation, the charge voltage of the traction battery can be flexibly regulated according to a relationship between the voltages of the charging device and the traction battery. In this way, the charging device can directly charge a traction battery with a voltage lower than an output voltage of the charging device and also boost charge a traction battery with a voltage higher than the output voltage of the charging device, so that charging of the traction battery is not limited by the maximum output voltage of the charging device.

Figure 11:
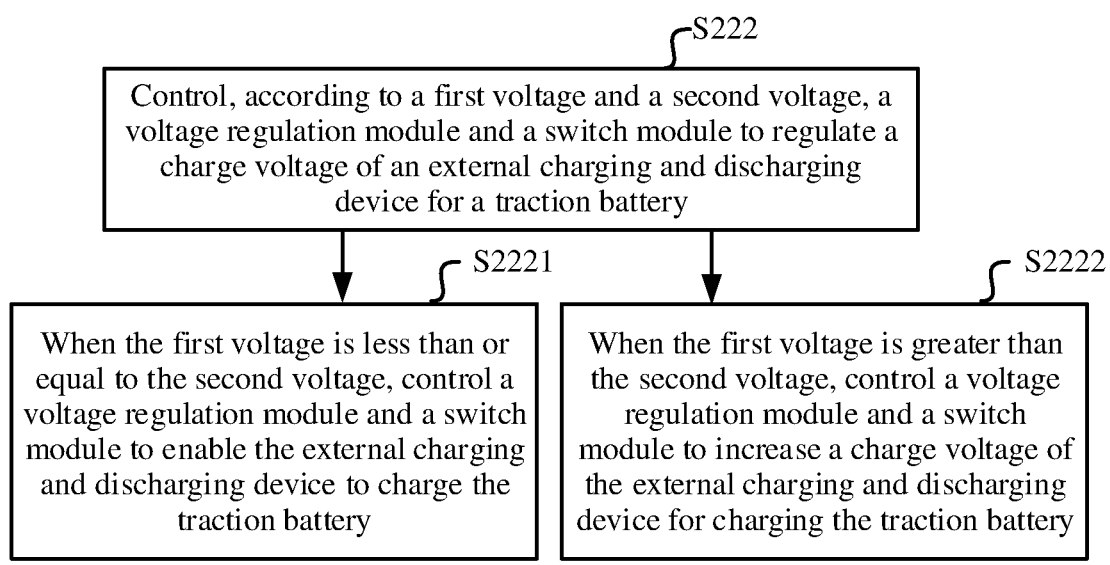
FIG. 11 is a schematic flowchart of a control method of another voltage regulation system for traction battery according to an embodiment of this application.

As shown in FIG. 11, in step S222, the controlling, according to the first voltage and the second voltage, the voltage regulation module and the switch module to regulate the charge voltage of the external charging and discharging device for the traction battery specifically includes the following steps.

S2221. When the first voltage is less than or equal to the second voltage, control the voltage regulation module and the switch module to enable the external charging and discharging device to directly charge the traction battery.

Further, S2221 specifically includes: control the third switch and the fourth switch to be on, and the first switch, the second switch, and the switch module to be off.

Figure 12:
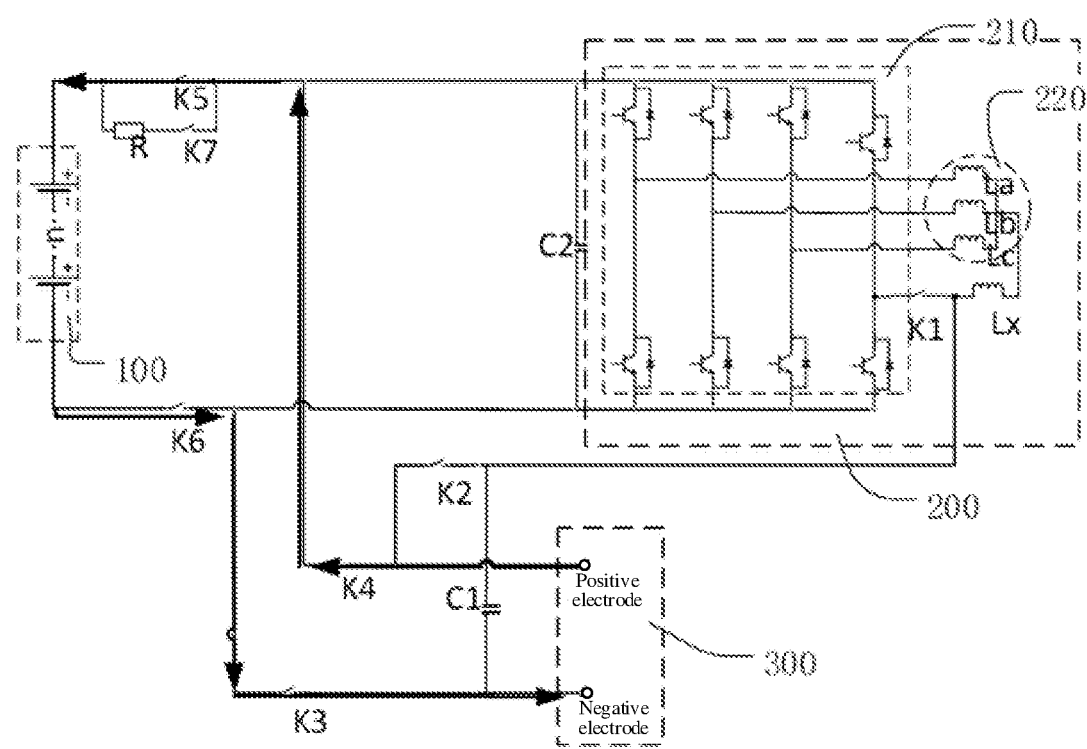
FIG. 12 and FIG. 13 are schematic diagrams of different charging loops of a voltage regulation system for traction battery for charging an external load according to embodiments of this application.

FIG. 12 is a schematic diagram of a charging loop of a corresponding voltage regulation system for traction battery in the regulation method in this case.

As shown in FIG. 12, a loop can be formed for the external charging and discharging device to directly charge the traction battery.

Therefore, with the circuit structure unchanged, when the voltage of the battery is less than or equal to the output voltage, the voltage regulation module and the switch module can be controlled to regulate the charge voltage of the external charging and discharging device for the traction battery, so that the external charging and discharging device directly charges the traction battery.

S2222. When the first voltage is greater than the second voltage, control the voltage regulation module and the switch module to increase the charge voltage of the external charging and discharging device for charging the traction battery.

Further, S2222 specifically includes: controlling the second switch, the third switch, and all upper legs in the leg set to be on, and the first switch, the fourth switch, and the charge-discharge switching module to be off.

Figure 13:
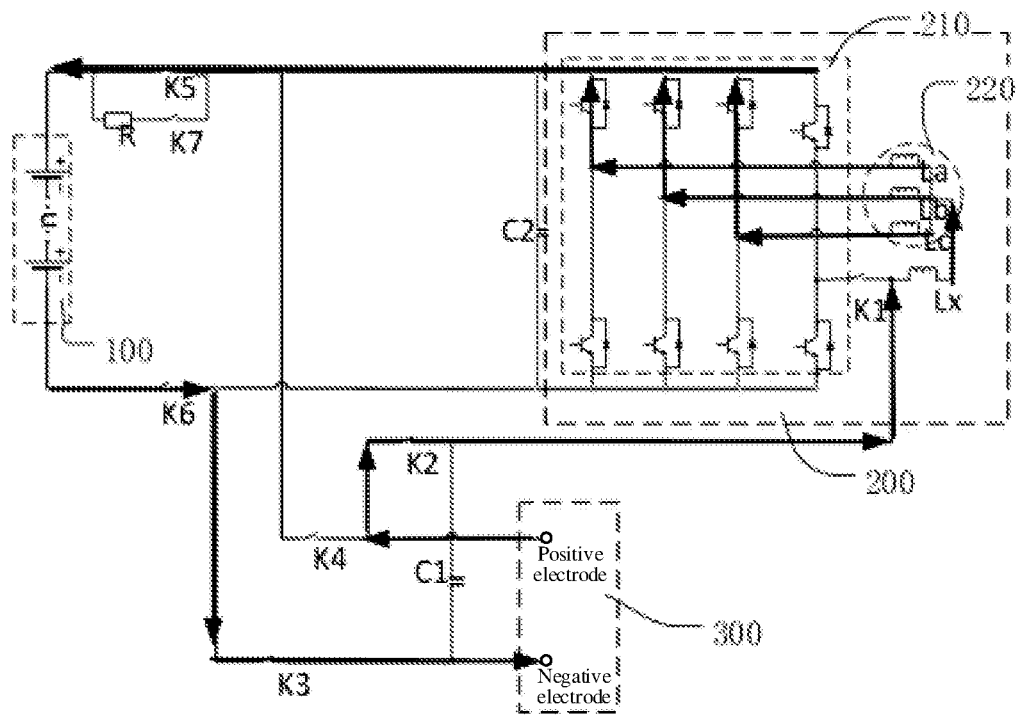

FIG. 13 is a schematic diagram of a boost charging loop of a corresponding voltage regulation system for traction battery in the regulation method in this case.

As shown in FIG. 13, a loop can be formed for the external charging and discharging device to boost charge the traction battery. First, the external charging and discharging device charges the motor so that the motor has a certain voltage; and then, the voltage provided by the external charging and discharging device is added to the voltage provided by the motor for charging the traction battery together. In this case, the added voltage is greater than the voltage of the traction battery, so it can charge the traction battery.

Therefore, with the circuit structure unchanged, when the voltage of the battery is greater than the output voltage, the voltage regulation module and the switch module can be controlled to regulate the charge voltage of the external charging and discharging device for the traction battery, so as to increase the charge voltage of the external charging and discharging device for charging the traction battery.

In conclusion, based on the voltage regulation method for traction battery provided in this implementation, with the circuit structure unchanged, the voltage regulation module and the switch module can be controlled, according to a magnitude relationship between the first voltage of the traction battery and the second voltage of the external charging and discharging device, to regulate the charge voltage of the external charging and discharging device for the traction battery, so that the external charging and discharging device directly charges the traction battery or the charge voltage of the external charging and discharging device for charging the traction battery is increased.

Figure 14:
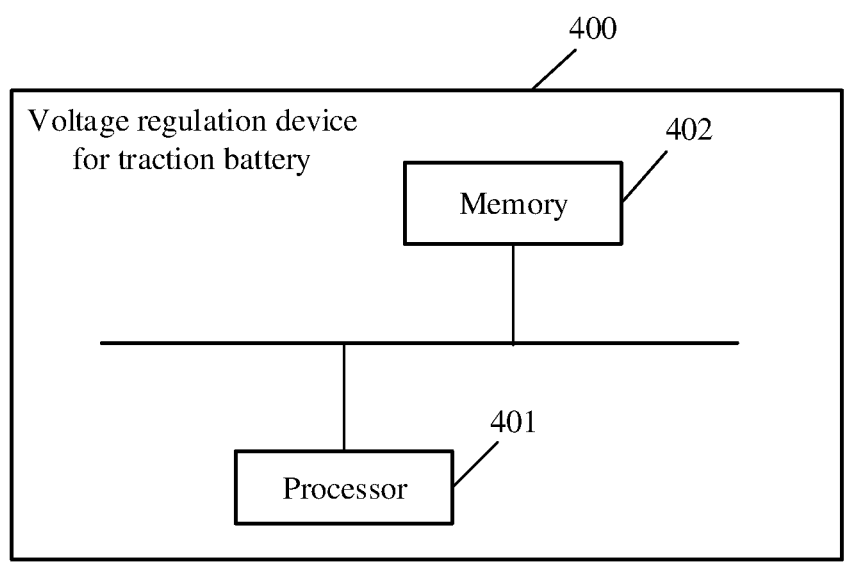
FIG. 14 is a schematic structural diagram of a voltage regulation device for traction battery according to an embodiment of this application.

FIG. 14 is a schematic structural diagram of a voltage regulation device 400 for traction battery according to an embodiment of this application.

As shown in FIG. 14, the voltage regulation device 400 for traction battery includes: a memory 402 configured to store executable instructions; and a processor 401 configured to be connected to the memory 402 to execute the executable instructions to implement the voltage regulation method for traction battery.

Persons skilled in the art can understand that the schematic diagram FIG. 14 is merely an example of the voltage regulation device 400 for traction battery and does not constitute any limitation on the voltage regulation device 400 for traction battery. The voltage regulation device 400 for traction battery may include more or fewer components than shown in the figure, or combine some of the components, or have different components, for example, the voltage regulation device 400 for traction battery may further include an input/output device, a network access device, a bus, and the like.

The processor 401 may be a central processing unit (CPU), or may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor 401 may be any other conventional processor or the like. The processor 401 is a control center of the voltage regulation device 400 for traction battery, and is connected to all components of the voltage regulation device 400 for traction battery by using various interfaces and lines.

The memory 402 can be configured to store computer-readable instructions, and the processor 401 implements various functions of the voltage regulation device 400 for traction battery by running or executing the computer-readable instructions or modules stored in the memory 402 and calling data stored in the memory 402. The memory 402 may mainly include a program storage area and a data storage area. The program storage area may store an operating system, an application program required by at least one function (for example, a sound play function or an image play function), and the like. The data storage area may store data created based on use of the voltage regulation device 400 for traction battery and the like. In addition, the memory 402 may include a hard disk, an internal memory, a plug-in hard disk, a smart media card (SMC), a secure digital (SD)

card, a flash card, at least one disk storage device, a flash memory device, a read-only memory (ROM), a random access memory (RAM), or another non-volatile/volatile storage device.

If the modules integrated into the voltage regulation device 400 for traction battery are implemented in a form of a software functional module and are sold or used as a separate product, the modules may be stored in a computer-readable storage medium. Based on such understanding, in the present invention, all or some of the processes in the method of the foregoing embodiments may be implemented by computer-readable instructions instructing related hardware. The computer-readable instructions may be stored in the computer-readable storage medium, and when the computer-readable instructions are executed by a processor, the steps in the foregoing method embodiments can be implemented.

In the voltage regulation device for traction battery provided in the embodiments of this application, the voltage regulation module and the switch module are controlled to switch between different charging and discharging loops, so as to flexibly and efficiently regulate, in response to the voltage regulation control signals under different charging and discharging requirements, the charge/discharge voltage between the traction battery and the power storage element and the charge voltage of the external charging and discharging device for the traction battery, thereby meeting the charge or discharge voltage requirements on the traction battery in different scenarios.

Finally, this application further provides a computer-readable storage medium, where the computer-readable storage medium stores a computer program, and the computer program is executed by a processor to implement the voltage regulation method for traction battery.

Persons of ordinary skill in the art can realize that the units and algorithm steps in the examples described with reference to the embodiments disclosed in this specification can be implemented by using electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this application.

Persons skilled in the art can clearly understand that, for the purpose of convenient and brief description, for a detailed working process of the foregoing system, apparatus, and unit, reference may be made to a corresponding process in the foregoing method embodiments, and details are not described herein again.

In several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate components may or may not be physically separate. The components displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

If the functions are implemented in a form of a software functional unit and are sold or used as a separate product, the functions may be stored in a computer-readable storage medium. Based on such understanding, the technical solutions of this application essentially, or the part thereof that contributes to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the method described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are only specific implementations of this application, but are not intended to limit the protection scope of this application. Any variation or replacement apparent to persons skilled in the art within the technical scope disclosed in this application shall fall within the protection scope of this application. Therefore, the protection scope of this application shall be subject to the protection scope of the claims.

What is claimed is:

1. A voltage regulation circuit for traction battery, comprising:
   a traction battery;
   a heating module;
   a charge/discharge interface; and
   a voltage regulation module;
   wherein
   the heating module comprises a power storage element and a switch module;
   the traction battery is connected in parallel to the switch module, and an external charging and discharging device is connected in parallel to the traction battery through the charge/discharge interface;
   the voltage regulation module comprises a plurality of switches and a power storage regulation element, and the plurality of switches and the power storage regulation element are disposed between the charge/discharge interface and the traction battery; and
   the voltage regulation module and the switch module are configured to regulate, in response to a voltage regulation control signal, a charge/discharge voltage between the traction battery and the power storage element and a charge voltage of the external charging and discharging device for the traction battery;
   wherein
   the voltage regulation module comprises a first switch, a second switch, a third switch, a fourth switch, and the power storage regulation element;
   the first switch is disposed between the power storage element and the switch module;

the second switch is disposed between the power storage element and the charge/discharge interface;
the third switch and the fourth switch are respectively disposed on a negative electrode side and a positive electrode side of the charge/discharge interface; and
the power storage regulation element is disposed between the power storage element and the switch module and also between the power storage element and the charge/discharge interface;
wherein a fifth switch is provided on the positive electrode side of the traction battery, and a sixth switch is provided on the negative electrode side of the traction battery; and
wherein the fifth switch is connected in parallel to a branch, and the branch comprises a resistor and a seventh switch connected in series.

2. The voltage regulation circuit according to claim 1, wherein
one terminal of the first switch is connected to the switch module, another terminal of the first switch is connected to a first terminal of the power storage regulation element, and a second terminal of the power storage regulation element is connected to the power storage element;
the first terminal of the power storage regulation element is also connected to one terminal of the second switch and the negative electrode side of the charge/discharge interface, and the other terminal of the second switch is connected to the positive electrode side of the charge/discharge interface;
the third switch is disposed between the negative electrode side of the charge/discharge interface and a negative electrode side of the traction battery; and
the fourth switch is disposed between the positive electrode side of the charge/discharge interface and a positive electrode side of the traction battery.

3. The voltage regulation circuit according to claim 2, wherein
the switch module comprises a charge-discharge switching module and a leg set;
the charge-discharge switching module is connected in parallel to the leg set, a first terminal of the power storage element is connected to the leg set, a second terminal of the power storage element is connected to the second terminal of the power storage regulation element, the first terminal of the power storage regulation element is connected to one terminal of the first switch, and the other terminal of the first switch is connected to the charge-discharge switching module.

4. The voltage regulation circuit according to claim 3, wherein a first capacitor is provided between the first terminal of the power storage regulation element and the negative electrode side of the charge/discharge interface.

5. The voltage regulation circuit according to claim 1, wherein the power storage regulation element is an inductive element.

6. The voltage regulation circuit according to claim 1, wherein
the switch module comprises a charge-discharge switching module and a leg set;
the charge-discharge switching module is connected in parallel to the leg set, a first terminal of the power storage element is connected to the leg set, and a second terminal of the power storage element is connected to the charge-discharge switching module.

7. The voltage regulation circuit according to claim 6, wherein the power storage element comprises an M-phase motor;
the leg set comprises M phase legs, M being a positive integer;
M phase windings of the M-phase motor are connected to joints between upper legs and lower legs of all of the M phase legs in one-to-one correspondence; and
the charge-discharge switching module comprises a first switching circuit and a second switching circuit connected in series, and a joint between the first switching circuit and the second switching circuit is connected to a neutral point of the M-phase motor.

8. The voltage regulation circuit according to claim 7, wherein both the first switching circuit and the second switching circuit comprise a triode and a flyback diode connected in parallel.

9. The voltage regulation circuit according to claim 7, wherein both the first switching circuit and the second switching circuit comprise a triode or a relay switch.

10. The voltage regulation circuit according to claim 7, wherein
the first switching circuit comprises a diode and the second switching circuit comprises a switch; or
the first switching circuit comprises a switch and the second switching circuit comprises a diode.

11. The voltage regulation circuit according to claim 7, wherein a switch and an inductor are provided between the joint between the first switching circuit and the second switching circuit and the neutral point of the M-phase motor.

12. The voltage regulation circuit according to claim 1, wherein a second capacitor is connected in parallel to the traction battery.

13. An electric device, comprising:
a control module; and
the voltage regulation circuit according to claim 1;
wherein the control module is connected to the switch module and the voltage regulation module, and is configured to control the voltage regulation module and the switch module to regulate the charge/discharge voltage between the traction battery and the power storage element and the charge voltage of the external charging and discharging device for the traction battery.

14. A voltage regulation method for traction battery, applied to a voltage regulation system that comprises an external charging and discharging device and an electric device, the electric device comprising a control module and the voltage regulation circuit according to claim 1; wherein the method comprises:
obtaining an enabling signal from the control module; and
controlling, according to the enabling signal, the voltage regulation module and the switch module to regulate a charge/discharge voltage between the traction battery and the power storage element; or
controlling, according to the enabling signal, the voltage regulation module and the switch module to regulate a charge voltage of the external charging and discharging device for the traction battery.

15. The voltage regulation method according to claim 14, wherein controlling, according to the enabling signal, the voltage regulation module and the switch module to regulate the charge/discharge voltage between the traction battery and the power storage element comprises:
controlling the voltage regulation module and the switch module to enable the traction battery to charge the power storage element; or
controlling the voltage regulation module and the switch module to enable the power storage element to charge the traction battery.

16. The voltage regulation method according to claim 14, wherein controlling, according to the enabling signal, the voltage regulation module and the switch module to regulate the charge voltage of the external charging and discharging device for the traction battery comprises:
   obtaining a first voltage of the traction battery and a second voltage of the external charging and discharging device; and
   controlling, according to the first voltage and the second voltage, the voltage regulation module and the switch module to regulate the charge voltage of the external charging and discharging device for the traction battery.

17. The voltage regulation method according to claim 16, wherein controlling, according to the first voltage and the second voltage, the voltage regulation module and the switch module to regulate the charge voltage of the external charging and discharging device for the traction battery comprises:
   when the first voltage is less than or equal to the second voltage, controlling the voltage regulation module and the switch module to enable the external charging and discharging device to charge the traction battery; and
   when the first voltage is greater than the second voltage, controlling the voltage regulation module and the switch module to increase the charge voltage of the external charging and discharging device for charging the traction battery.

18. The voltage regulation method for traction battery according to claim 17, wherein the switch module comprises a charge-discharge switching module and a leg set, the charge-discharge switching module is connected in parallel to the leg set, and the leg set comprises three phase legs; and the voltage regulation module comprises a first switch, a second switch, a third switch, a fourth switch, and a power storage regulation element;
   wherein controlling the voltage regulation module and the switch module to enable the external charging and discharging device to charge the traction battery comprises:
   controlling the third switch and the fourth switch to be on, and the first switch, the second switch, and the switch module to be off; and
   wherein controlling the voltage regulation module and the switch module to increase the charge voltage of the external charging and discharging device for charging the traction battery comprises:
   controlling the second switch, the third switch, and all upper legs in the leg set to be on, and the first switch, the fourth switch, and the charge-discharge switching module to be off.

* * * * *